(12) United States Patent  (10) Patent No.: US 8,121,634 B2
Aoyama et al.  (45) Date of Patent: Feb. 21, 2012

(54) RADIO COMMUNICATION TERMINAL DEVICE, RADIO COMMUNICATION BASE STATION DEVICE, AND RADIO COMMUNICATION METHOD

(75) Inventors: Takahisa Aoyama, Kanagawa (JP); Akito Fukui, Kanagawa (JP); Dragan Petrovic, Darmstadt (DE)

(73) Assignee: Panasonic Corporation, Osaka (JP)

( * ) Notice: Subject to any disclaimer, the term of this patent is extended or adjusted under 35 U.S.C. 154(b) by 382 days.

(21) Appl. No.: 12/306,596

(22) PCT Filed: Jun. 25, 2007

(86) PCT No.: PCT/JP2007/062712
§ 371 (c)(1),
(2), (4) Date: Dec. 24, 2008

(87) PCT Pub. No.: WO2008/001726
PCT Pub. Date: Jan. 3, 2008

(65) Prior Publication Data
US 2009/0186614 A1  Jul. 23, 2009

(30) Foreign Application Priority Data

Jun. 26, 2006  (JP) ................................. 2006-175821
Nov. 2, 2006  (JP) ................................. 2006-299297

(51) Int. Cl.
*H04M 1/00* (2006.01)
(52) U.S. Cl. ...................... 455/550.1; 455/434; 455/436; 370/327
(58) Field of Classification Search ............... 455/550.1, 455/434, 436; 370/327
See application file for complete search history.

(56) References Cited

U.S. PATENT DOCUMENTS

| | | | |
|---|---|---|---|
| 6,377,803 B1* | 4/2002 | Ruohonen | 455/434 |
| 2005/0221833 A1* | 10/2005 | Granzow et al. | 455/450 |
| 2005/0233732 A1 | 10/2005 | Kwak | |
| 2006/0126554 A1* | 6/2006 | Motegi et al. | 370/328 |
| 2007/0060095 A1* | 3/2007 | Subrahmanya et al. | 455/343.1 |

FOREIGN PATENT DOCUMENTS

| | | |
|---|---|---|
| EP | 1 499 144 | 1/2005 |
| JP | 6-13959 | 1/1994 |
| JP | 2003-348001 | 12/2003 |
| JP | 2004-356684 | 12/2004 |
| JP | 2005-236988 | 9/2005 |
| JP | 2005-260906 | 9/2005 |
| WO | 2005/079104 | 8/2005 |

OTHER PUBLICATIONS

International Search Report dated Oct. 9, 2007.

(Continued)

*Primary Examiner* — Danh Le
(74) *Attorney, Agent, or Firm* — Dickinson Wright PLLC

(57) ABSTRACT

It is possible to provide a radio communication terminal device, a radio communication base station device, and a radio communication method capable of rapidly completing a handover even during DRX/DTX. In the devices and the method, a terminal (100) transmits a quality measurement result to a base station (150) at an Active interval. Here, the terminal (100) sets the DRX/DTX interval to a short interval since performance of a handover is predicted. The base station (150) which has received the quality measurement result transmitted from the terminal (100) recognizes that the terminal has set the DRX/DTX interval to a short interval and transmits a handover instruction to the terminal (100) at the Active interval, considering the shortened DRX/DTX interval.

10 Claims, 20 Drawing Sheets

OTHER PUBLICATIONS

3GPP TS25.331, v7.1.0, Technical Report, 3rd Generation Partnership Project, Technical Specification Group Radio Access Network, Radio Resource Control (RRC), Protocol Specification, Jun. 2006, pp. 1-1272, p. 5, Line 22.

3GPP TS25.813, v7.0.0 3rd Generation Partnership Project, Technical Specification Group Radio Access Network, Evolved Universal Terrestrial Access (E-UTRA) and Evolved Universal Terrestrial Radio Access Network E-UTRA) Radio interface Protocol Aspects, Jun. 2006, pp. 1-39, p. 5, Line 26.

* cited by examiner

RADIO COMMUNICATION TERMINAL DEVICE, RADIO COMMUNICATION BASE STATION DEVICE, AND RADIO COMMUNICATION METHOD

TECHNICAL FIELD

The present invention relates to a radio communication terminal apparatus, radio communication base station apparatus and radio communication method for performing handover processing.

BACKGROUND ART

There are roughly two states subject to radio resource control ("RRC") state management of terminals according to 3GPP UMTS System Release 1999 or equivalent, which has been standardized (see Non-Patent Document 1). These two states are two RRC states, namely "RRC connected mode" and "RRC idle mode." The RRC connected mode is further divided into the following four states, namely "CELL_DCH," "CELL_FACH," "CELL_PCH" and "URA_PCH."

CELL_DCH refers to a state in which a terminal and a base station are connected via a dedicated channel, and significant power is consumed in this state since transmission and reception are carried out constantly. Furthermore, since a dedicated channel is set up, a large amount of data can be communicated. Moreover, the transfer control is a network control. That is to say, when a measurement report is received from the terminal, a cell switch command is issued from the network.

CELL_FACH refers to a state in which a terminal and a base station communicate via a shared channel, and less power is consumed in this state than in CELL_DCH since transmission and reception are carried out only when necessary. Furthermore, since a plurality of terminals communicate within a limit of a shared channel, CELL_FACH is not appropriate for communicating a large amount of data. Furthermore, the transfer control is a terminal control. That is to say, when a terminal moves from one cell to another, it is necessary to change its state to CELL_DCH or CELL_FACH and perform a new cell registration (i.e. cell update).

CELL_PCH refers to a state in which a terminal waits for new data to be generated or a call from a base station, and no data is communicated in this state. Furthermore, setting information and so on for earlier services is retained. Furthermore, in the case of transfer within a cell, CELL_PCH assumes a waiting state at discontinuous receiving intervals (i.e. DRX: discontinuous reception), in which no data is communicated and little power is consumed. Moreover, the transfer control is a terminal control. That is to say, when a terminal moves from one cell to another, it is necessary to change its state to CELL_DCH or CELL_FACH and perform a new cell registration (i.e. cell update).

URA_PCH refers to a state in which a terminal waits for new data to be generated or a call from a base station, and no data is communicated in this state. Furthermore, setting information and so on for earlier services is retained. Furthermore, in the case of transfer within a UTRAN registration area ("URA": i.e. a plurality of cell groups), URA_PCH assumes a waiting state, in which no data is communicated and little power is consumed. Moreover, the transfer control is a terminal control. That is to say, when a terminal moves from one URA to another, it is necessary to change its state to CELL_DCH or CELL_FACH and perform a new URA registration (i.e. URA update).

Next, the RRC idle mode refers to a state in which a terminal waits for new data to be generated or a call from a base station, and no data is communicated in this state. Furthermore, setting information and so on for earlier services is not retained. Furthermore, in the case of transfer within a routing area ("RA") or location area ("LA") (i.e. a plurality of cell groups), the RRC idle mode assumes a waiting state, in which no data is communicated and little power is consumed. Moreover, the transfer control is a terminal control. That is to say, when a terminal moves from one RA to another, it is necessary to change its state to CELL_DCH or CELL_FACH and perform a new RA registration (i.e. RA update).

FIG. 1 shows a conceptual diagram of these RRC states and state transitions. The network side makes a terminal transition to an RRC state suitable to the condition of the terminal according to the state transitions shown in FIG. 1, thereby reducing the power consumption of the terminal and realizing effective use of radio resources.

However, this system has the following major problems. First, given that there are many states and controlling both terminals and the network is complicated. Second, given that a state transition is started by an RRC message and the transition takes time, it is difficult to make transitions more frequently.

Therefore, studies are underway for efficient terminal state management in long term evolution ("LTE")/system architecture evolution ("SAE"), which is standardized by the 3GPP, and the inclusion of only the following two states is anticipated (see Non-Patent Document 2).

In the RRC connected mode, data is communicated between a terminal and a base station using a shared channel and a control channel is used to use the shared channel. Furthermore, if there is no data, power consumption is reduced by employing discontinuous reception (i.e. DRX: Discontinuous Reception) and discontinuous transmission (i.e. DTX: Discontinuous Transmission). Furthermore, the volume of data communication is controlled through shared channel resource allocation. Furthermore, the transfer control is a network control. That is to say, when a measurement report is received from the terminal, a cell switch command is issued from the network.

On the other hand, the RRC idle mode refers to a state in which a terminal waits for new data to be generated or a call from a base station and in which therefore no data is communicated. Furthermore, setting information and so on for earlier services is not retained. Furthermore, in the case of a transfer within a tracking area) (i.e. "TA": a plurality of cell groups), the RRC idle mode assumes a waiting state, in which no data is communicated and little power is consumed. Moreover, the transfer control is a terminal control. That is to say, when a terminal moves from one TA to another, it is necessary to change its state to RRC connected mode and perform new TA registration (i.e. TA update).

In this way, unlike the above-described UMTS, in LTE/SAE, it is necessary to perform the transfer control through a network control for terminals in a DRX/DTX state.

Non-Patent Document 1: 3GPP, TS25.331, 3rd Generation Partnership Project, Technical Specification Group Radio Access Network, Radio Resource Control (RRC), Protocol Specification.

Non-Patent Document 2: 3GPP, TS25.813, 3rd Generation Partnership Project, Technical Specification Group Radio Access Network, Evolved Universal Terrestrial Access (E-UTRA) and Evolved Universal Terrestrial Radio Access Network (E-UTRAN), Radio interface protocol aspects.

DISCLOSURE OF INVENTION

Problems to be Solved by the Invention

When realizing transfer control through network control, it is necessary to communicate messages for transfer control between a terminal and the currently connecting base station. To be more specific, (1) and (2) of the following three steps (1) to (3) need to be carried out before a transfer.

(1) Quality Measurement Report (Measurement Report):

This quality measurement report is a message sent from a terminal to the currently connecting base station (before handover), and reports the radio quality of its own cell and neighboring cells measured by the terminal.

(2) Handover Indication (or, in UMTS, Messages Such as "Physical Channel Reconfiguration"):

This handover indication is a message sent from the currently connecting base station (before handover) to a terminal and reports to which base station and with what setting the terminal is connected.

(3) Handover Completion Report (Handover Complete, or, in UMTS, Messages Such as "Physical Channel Reconfiguration Complete"):

This handover completion report is a message sent from a terminal to a newly connected base station (after handover) and reports that a handover has been successfully finished.

However, the DRX/DTX intervals use may assume relatively large values. That is, even if it is decided in (1) to receive radio quality and perform a handover, if the terminal is in a DRX/DTX period, a handover indication cannot be transmitted until the DRX/DTX period is over, and, during that period, the terminal may go beyond the service range of the current cell (i.e. own cell) (see FIG. 2).

In this case, the connection between the terminal and the network is cut, resulting in a serious problem that the user cannot continue services.

As a remedial measure for this, the base station side may control the DRX/DTX interval when triggered by a quality measurement report. That is, as shown in FIG. 3, the base station which has received a quality measurement report from the terminal may determine to change the DRX/DTX interval and report the change to the terminal so that the terminal can receive a handover indication.

However, while this method is effective if the active interval (i.e. interval during which a terminal carrying out DRX/DTX transmits or receives data) is relatively long, a DRX/DTX interval report may not be transmitted when the active interval is short.

It is therefore an object of the present invention to provide a radio communication terminal apparatus, radio communication base station apparatus and radio communication method that complete a handover fast even during a DRX/DTX period.

Means for Solving the Problem

The radio communication terminal apparatus of the present invention adopts a configuration including: a reception means that receives a signal transmitted from a radio communication base station apparatus; a quality measurement means that measures quality of the received signal; a DRX/DTX control means that controls an interval of discontinuous reception and discontinuous transmission based on control information included in the received signal for controlling the interval of discontinuous reception and discontinuous transmission and based on a quality measurement result; and a transmission means that transmits the quality measurement result to the radio communication base station apparatus.

The radio communication base station apparatus of the present invention adopts a configuration including: a quality measurement result acquisition means that acquires a quality measurement result transmitted from a radio communication terminal apparatus and measured at the radio communication terminal apparatus; a transmission means that transmits a message including control information for controlling an interval of discontinuous reception and discontinuous transmission based on the acquired quality measurement result to the radio communication terminal apparatus; and a DRX/DTX control means that controls the interval of discontinuous reception and discontinuous transmission of the radio communication base station apparatus in accordance with the interval of discontinuous reception and discontinuous transmission changed at the radio communication terminal apparatus, based on the acquired quality measurement result and the control information.

The radio communication method of the present invention includes: a quality measurement step of measuring quality of a signal received from a radio communication base station apparatus at a radio communication terminal apparatus; a first DRX/DTX control step of controlling an interval of discontinuous reception and discontinuous transmission of the radio communication terminal apparatus based on first control information for controlling the interval of discontinuous reception and discontinuous transmission and based on the quality measurement result; a first transmission step of transmitting the quality measurement result to the radio communication base station apparatus; a quality measurement result acquisition step of acquiring at the radio communication base station apparatus the quality measurement result measured at the radio communication terminal apparatus; a second transmission step of transmitting a message including second control information for controlling the interval of discontinuous reception and discontinuous transmission based on the acquired quality measurement result, to the radio communication terminal apparatus; and a second DRX/DTX control step of controlling the interval of discontinuous reception and discontinuous transmission of the radio communication base station apparatus in accordance with the interval of discontinuous reception and discontinuous transmission changed at the radio communication terminal, based on the acquired quality measurement result and the second control information.

Advantageous Effect of the Invention

According to the present invention, it is possible to complete a handover fast even during a DRX/DTX period.

BEST MODE FOR CARRYING OUT THE INVENTION

Figure 1:
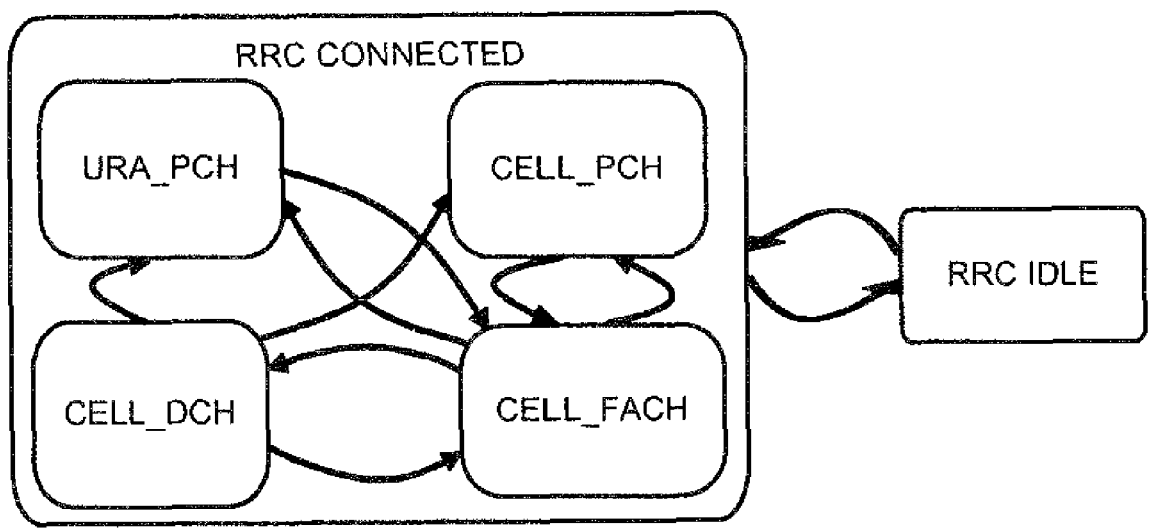
FIG. 1 is a conceptual diagram of RRC states and state transitions.
Figure 2:
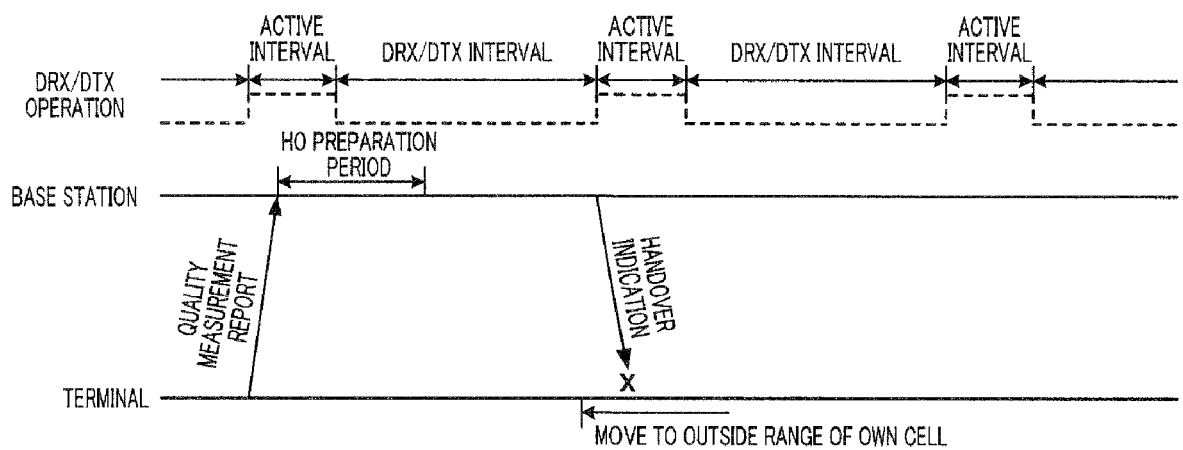
FIG. 2 is a timing chart during handover processing.
Figure 3:
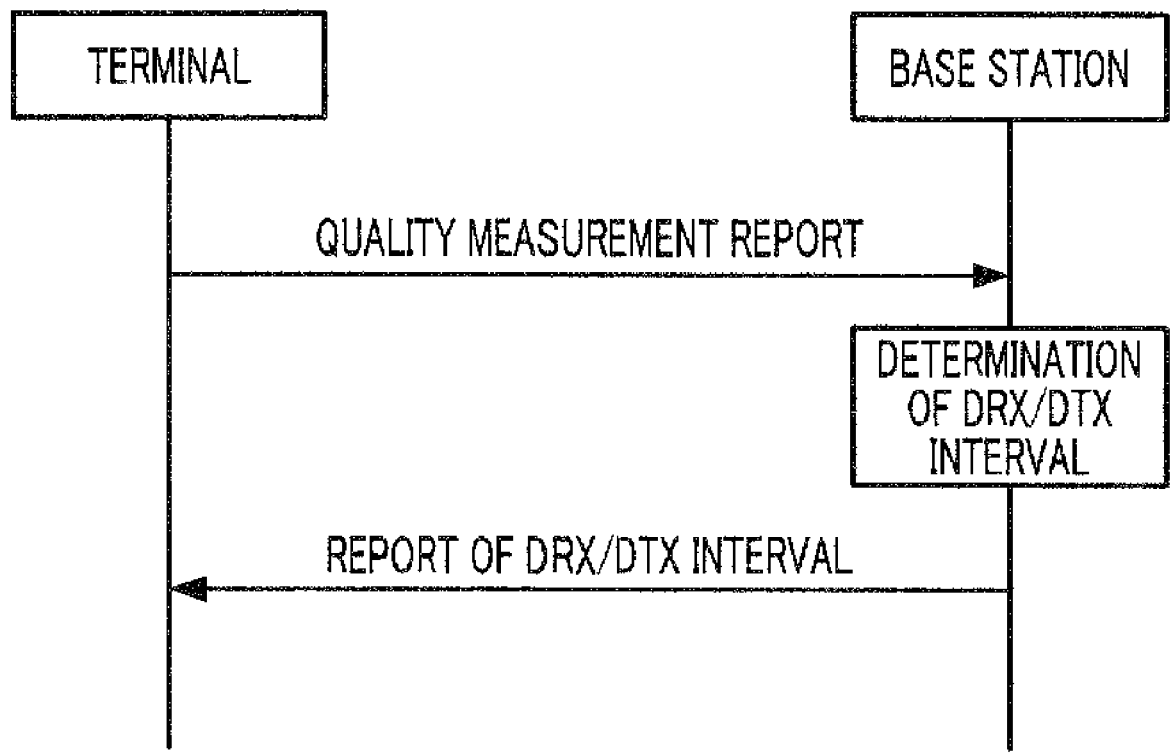
FIG. 3 is a sequence diagram showing change processing of a DRX/DTX interval.

Embodiments of the present invention will be explained below in detail with reference to the accompanying drawings. However, components having the same functions between embodiments will be assigned the same reference numerals and overlapping explanations will be omitted.

Embodiment 1

Figure 4:
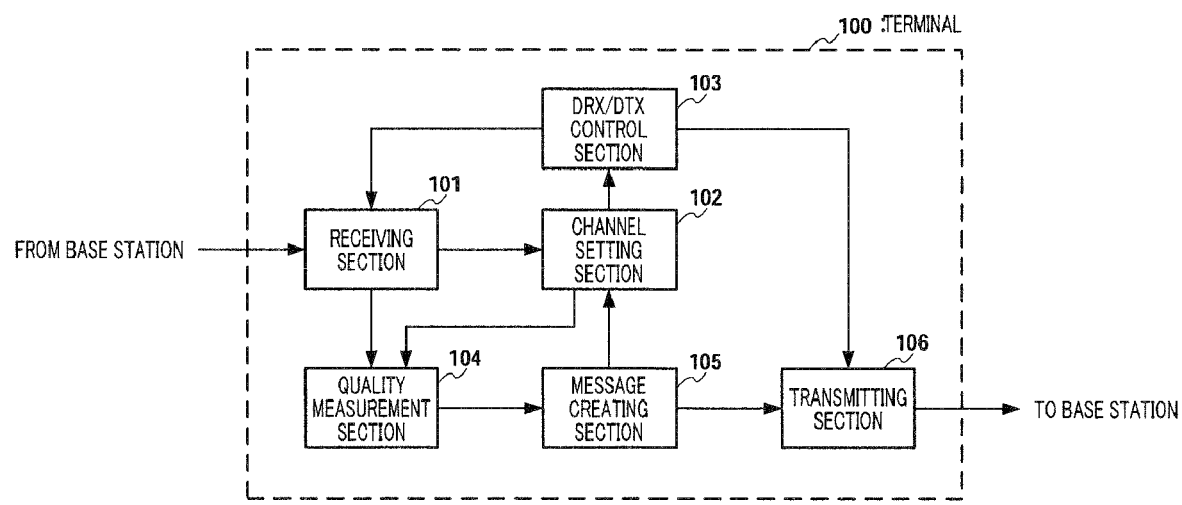
FIG. 4 is a block diagram showing a terminal according to Embodiment 1 of the present invention.

FIG. 4 is a block diagram showing a configuration of terminal 100 according to Embodiment 1 of the present invention. In this figure, receiving section 101 receives a signal transmitted from a base station, outputs control information and so on of the received signal to channel setting section 102 and outputs a reference signal (i.e. pilot signal) and so on, to quality measurement section 104. Furthermore, receiving section 101 determines whether or not to perform receiving processing under the control of DRX/DTX control section 103 (described later).

Channel setting section 102 performs a channel setting based on channel setting information included in the signal outputted from receiving section 101. The channel setting information includes command information about the execution of quality measurement and execution of DRX/DTX control and so on and channel setting section 102 controls quality measurement section 104 based on the channel setting information. Furthermore, upon acquiring a quality measurement result from message creating section 105 (described later), channel setting section 102 controls DRX/DTX control section 103 so as to set a DRX/DTX interval (10 ms interval, 100 ms interval, and so on) according to the quality measurement result acquired. Furthermore, when transmitting the quality measurement result, channel setting section 102 also holds information as to which DRX/DTX interval to change to.

DRX/DTX control section 103 controls the DRX of receiving section 101 and the DTX of transmitting section 106 under the control of channel setting section 102.

Upon receiving a command for executing quality measurement from channel setting section 102, quality measurement section 104 measures quality such as a reference signal (i.e. pilot signal) outputted from receiving section 101, and outputs the measurement result to message creating section 105. The quality measurement result will be described later.

Message creating section 105 creates a message including the measurement result outputted from quality measurement section 104, and outputs the created message to transmitting section 106. Furthermore, message creating section 105 outputs the measurement result outputted from quality measurement section 104 to channel setting section 102.

Transmitting section 106 determines whether or not to perform transmission processing based on the controls of DRX/DTX control section 103 and transmits, when performing transmission, the message outputted from message creating section 105 to the base station.

Here, the mode of reporting the quality measurement result at quality measurement section 104 will be explained. Roughly classifying, the 3GPP provides two modes of reporting. One is a mode in which a report is sent when a specific event occurs and the other is a method of sending a report on a regular basis. Generally, reporting only when a specific event occurs is more efficient than reporting on a regular basis, and therefore the first method will be mainly explained here. According to the 3GPP, there are the following typical events in a measurement result report within the same frequency. Event $1a$: A cell of high enough quality to be a new reporting target is detected. Event $1b$: The quality of a reporting target cell is deteriorated and the cell drops from the reporting targets. Event $1c$: A cell of better quality than the reporting target cells is detected. Event $1d$: The optimal cell changes.

For these reasons, the possibility that a handover takes place in the terminal varies between events. To be more specific, in event $1a$, only a new cell of good quality is detected and a handover may not necessarily take place immediately. In event $1b$, a reporting target cell simply drops, and this does not directly lead to handover processing. Event $1c$ is similar to event $1a$. In event $1d$, since the optimal cell changes, a handover should take place immediately. These can be summarized as follows. Event $1d$: DRX/DTX is set in response to a handover indication. Event $1a$, event $1c$: DRX/DTX is adjusted because a handover may take place. Event $1b$: DRX/DTX needs not particularly be changed.

As shown above, whether or not it is necessary to control the DRX/DTX interval varies depending on in which event a quality measurement result is transmitted. Therefore, performing DRX/DTX interval control which varies between events, will be considered below.

Figure 5:
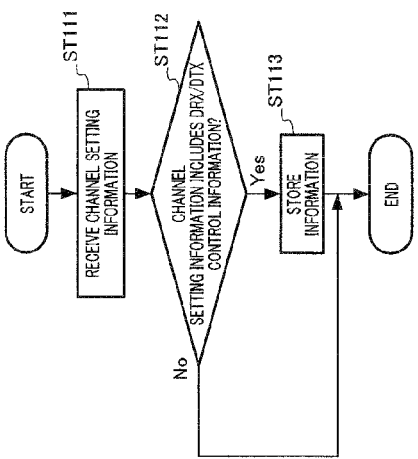
FIG. 5 is a flowchart showing a channel setting/change step of the terminal shown in FIG. 4.

FIG. 5 is a flowchart showing a channel setting/change step of terminal 100 shown in FIG. 4. In this figure, in step (hereinafter abbreviated as "ST") 111, channel setting section 102 receives channel setting information. Here, the channel setting information transmitted from the base station may be broadcast to all terminals using a broadcast channel (broadcast control channel: BCCH) or reported to each individual terminal using a dedicated control channel (dedicated control channel: DCCH). Furthermore, channel setting information may be reported by combining these two channels or using any method. In the case of combining a broadcast channel and dedicated control channels for use, a common setting is transmitted to terminals using the broadcast channel and settings that vary between terminals are transmitted through the dedicated control channels.

In ST112, whether or not the channel setting information includes DRX/DTX control information is decided. The terminal and the base station must use the same DRX/DTX control information values. The process moves to ST113 when the DRX/DTX control information is included or the process is finished otherwise. The format of the DRX/DTX control information included in the channel setting information can have the following patterns.

One is a method of specifying a DRX/DTX interval to use for normal operation without an event and specifying in addition to the DRX/DTX interval to use when events occur. Another one is a method of associating DRX/DTX interval patterns for use with indexes and so on and specifying DRX/DTX intervals based on indexes so that the index of which number is used during normal operation and the indexes of which numbers are used upon events are specified. Furthermore, it is also possible to report a plurality of DRX/DTX intervals that can be used during normal operation here and control the DRX/DTX interval that is actually used using additional signals, using a timer, and by other means.

In ST113, channel setting section 102 holds DRX/DTX control information and the process is finished.

Figure 6:
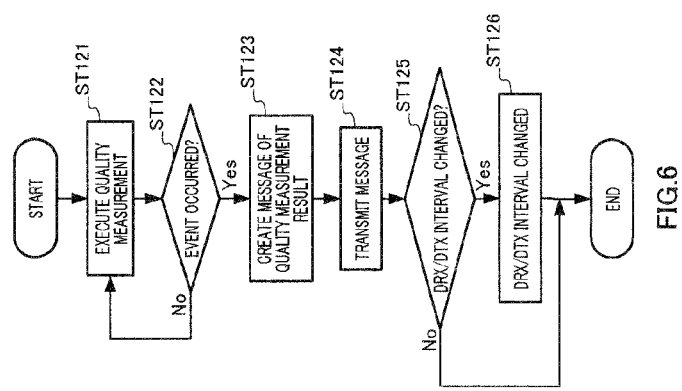
FIG. 6 is a flowchart showing a handover step of the terminal shown in FIG. 4.

FIG. 6 is a flowchart showing the handover steps by terminal 100 shown in FIG. 4. In this figure, in ST121, quality measurement section 104 performs quality measurement of a received signal and it is decided in ST122 based on the quality measurement whether or not an event has occurred. The process moves to ST123 when an event has occurred or returns to ST121 otherwise.

In ST123, message creating section 105 creates a message including the quality measurement result and in ST124, transmitting section 106 transmits a message to the base station.

In ST125, channel setting section 102 decides whether or not to change the DRX/DTX interval using DRX/DTX control information held in advance, and the process moves to ST126 when the DRX/DTX interval changes or is finished otherwise.

In ST126, channel setting section 102 controls DRX/DTX control section 103 so as to change the DRX/DTX interval.

Figure 7:
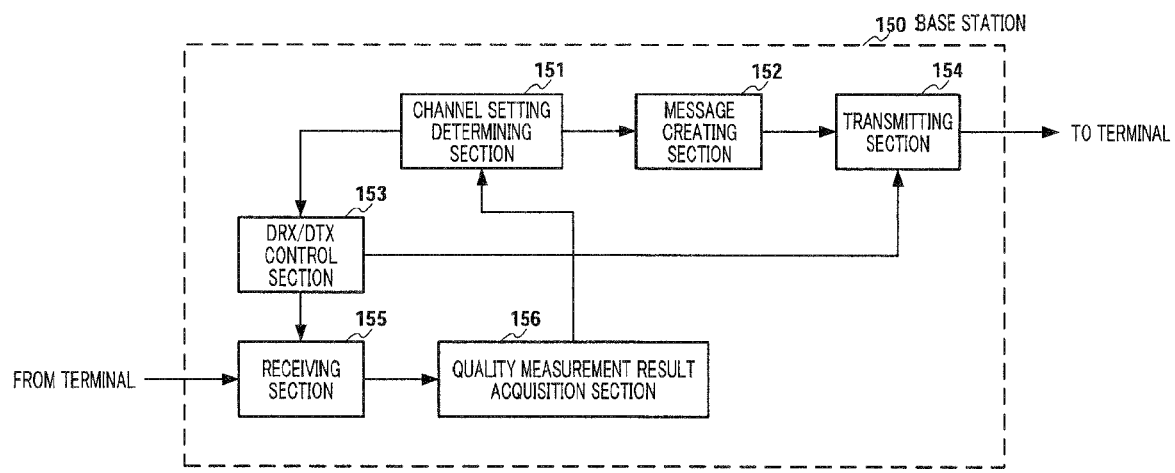
FIG. 7 is a block diagram showing a configuration of a base station according to Embodiment 1 of the present invention.

FIG. 7 is a block diagram showing a configuration of base station 150 according to Embodiment 1 of the present invention. In this figure, channel setting determining section 151 determines the details of channel setting prepared by terminal 100 shown in FIG. 4 based on the quality measurement result outputted from quality measurement result acquisition section 156 (described later), and outputs the determined details (i.e. channel setting information) to message creating section 152 and DRX/DTX control section 153. This channel setting information also includes DRX/DTX control information.

Message creating section 152 creates a message including the channel setting information outputted from channel setting determining section 151, and outputs the created message to transmitting section 154.

DRX/DTX control section 153 controls transmitting section 154 and receiving section 155 based on the DRX/DTX control information out of the channel setting information outputted from channel setting determining section 151.

Transmitting section 154 determines whether or not to perform transmission processing based on the controls of DRX/DTX control section 153, and transmits, when performing transmission, the message outputted from message creating section 152 to terminal 100. Terminal 100 needs to perform reception at timing at which base station 150 performs transmission, and, in other words, transmitting section 154 needs to perform transmission at timings terminal 100 performs reception. Furthermore, a reference signal (i.e. pilot signal) used for quality measurement is also transmitted from transmitting section 154.

Receiving section 155 determines whether or not to perform receiving processing based on the controls of DRX/DTX control section 153 and receives, when performing reception, a signal transmitted from terminal 100 and outputs the received signal to quality measurement result acquisition section 156.

Quality measurement result acquisition section 156 acquires the quality measurement result measured by terminal 100 from the signal outputted from receiving section 155, and outputs the quality measurement result acquired to channel setting determining section 151.

Figure 8:
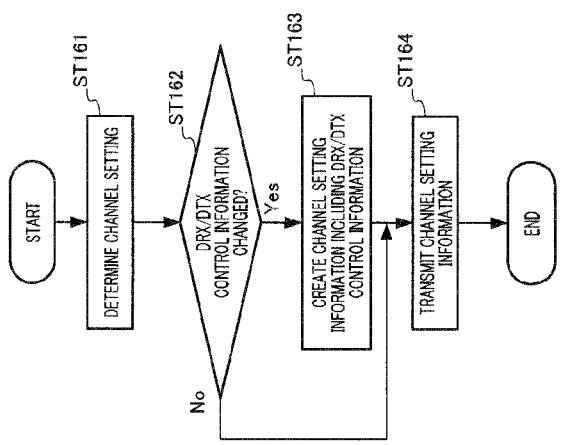
FIG. 8 is a flowchart showing a channel setting/change step of the base station shown in FIG. 7.

FIG. 8 is a flowchart showing a channel setting/change step of base station 150 shown in FIG. 7. In this figure, in ST161, channel setting determining section 151 determines the channel setting of terminal 100 and uses the details determined as channel setting information. The channel setting information about the DRX/DTX interval (e.g., 20 ms interval) will be set in subsequent steps.

It is decided in ST162 whether or not to change DRX/DTX control information when an event occurs and the process moves to ST163 when the DRX/DTX control information changes or directly moves to ST164 otherwise.

In ST163, channel setting information including DRX/DTX control information is created. As described above, DRX/DTX control information may change every event and therefore is made settable for each event.

In ST164, the channel setting information is transmitted to terminal 100. As described above, channel setting information can be transmitted to terminal 100 using a broadcast channel, dedicated control channels or combinations of these channels.

Figure 9:
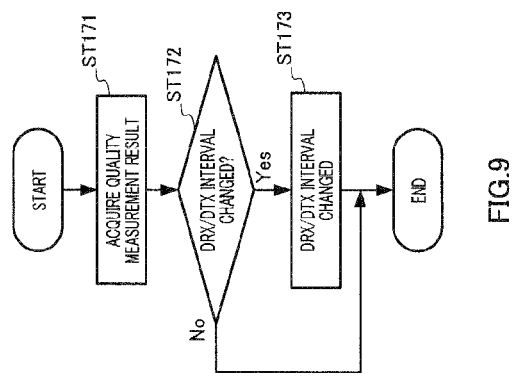
FIG. 9 is a flowchart showing a handover step of the base station shown in FIG. 7.

FIG. 9 is a flowchart showing a handover step of base station 150 shown in FIG. 7. In this figure, in ST171, quality measurement result acquisition section 156 acquires the quality measurement result transmitted from terminal 100, and, in ST172, channel setting determining section 151 decides whether or not to change the DRX/DTX interval based on the quality measurement result. The process moves to ST173 when the DRX/DTX interval changes or the process is finished otherwise.

In ST173, channel setting determining section 151 reports that the DRX/DTX interval will be changed and the value thereof to DRX/DTX control section 153. DRX/DTX control section 153 changes the DRX/DTX interval based on the indication and base station 150 performs scheduling and so on terminal 100 based on the changed DRX/DTX interval.

Figure 10:
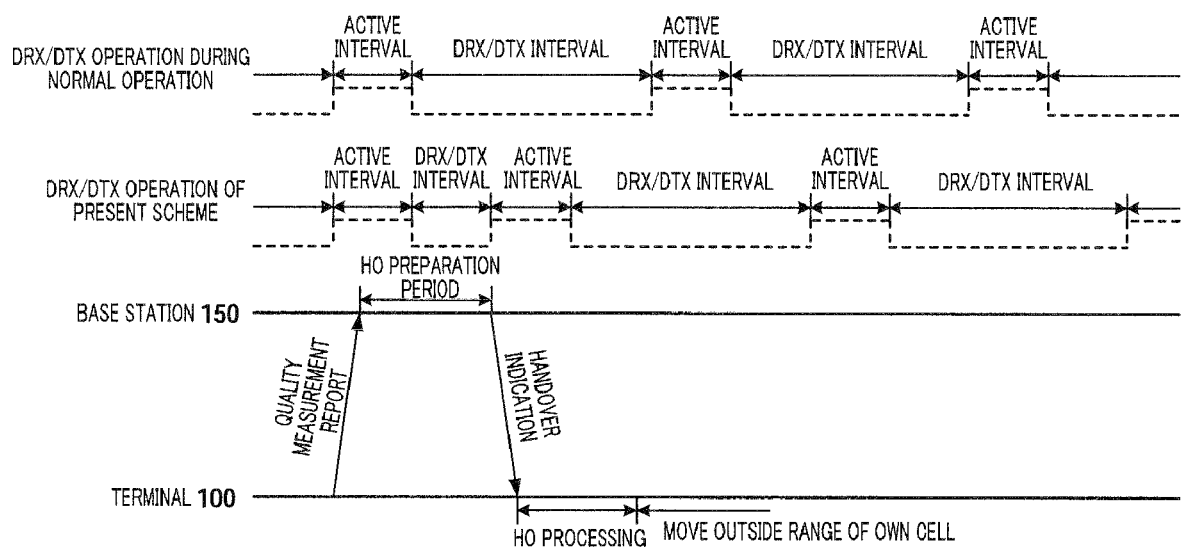
FIG. 10 is a timing chart during handover processing.

FIG. 10 is a timing chart during handover processing. Terminal 100 transmits the quality measurement result to base station 150 during an active interval. At this time, since terminal 100 anticipates a handover, terminal 100 sets a short DRX/DTX interval.

Upon receiving the quality measurement result transmitted from terminal 100, base station 150 recognizes that the terminal has set the short DRX/DTX interval, and transmits a handover indication to terminal 100 during the active interval taking into account the shortened DRX/DTX interval. This allows terminal 100 to receive the handover indication earlier and perform a handover to a specified cell according to the handover indication.

In this way, with Embodiment 1, the DRX/DTX interval is changed for both the terminal and the base station when triggered by a quality measurement result report from the terminal to the base station, so that it is possible to complete a handover fast even during a DRX/DTX period.

Although the present embodiment has been explained to report the DRX/DTX values for all events, the present invention is by no means limited to this and it is equally possible to the report DRX/DTX values for only specific events, use one value for all events, or use one value for a plurality of specific events.

The present embodiment has been explained assuming that the DRX/DTX interval is simply set to a new value, but the present invention is not limited to this, and the DRX/DTX interval may also be set to ½, ¼ and so on of the current DRX/DTX interval. Furthermore, an active interval may be particularly provided so as to receive a specific message. Furthermore, the setting of the active interval may also be changed. Furthermore, in case a timely return of a response is anticipated, the DRX/DTX operation may also be finished.

Furthermore, a case where the DRX/DTX interval currently being used is shorter while the DRX/DTX interval associated with an event is longer may occur under specific conditions. In such a case, the DRX/DTX interval needs not be changed.

Although the present embodiment does not particularly mention how to set back a DRX/DTX interval that has changed, it is possible to, set back a DRX/DTX interval after a handover or set a DRX/DTX interval having changed by a quality measurement report back to the original DRX/DTX interval after the DRX/DTX interval is used once or a plurality of times. Furthermore, it is also possible to include, as the information about the channel setting, the number of times a certain DRX/DTX interval has been changed as the DRX/DTX interval that should be used.

As described above, among the quality measurement reports introduced by the 3GPP, there are quality measurement reports that are transmitted on a regular basis in addition to the times events occur. In this case, similar processing can be realized. That is, channel setting determining section 151 may determine the rules as to how to control the periodic reporting and give the rules to the terminal, and channel setting section 102 may check the values of periodic reporting results and decide whether or not to change DRX/DTX.

Although the present embodiment has not particularly mentioned the roles of radio resource control ("RRC") and medium access control ("MAC"), the present invention is implemented with RRC and MAC. However, the assignment of roles, whether or not to use other protocols and so on, are by no means limited.

The "quality measurement report" in the present invention corresponds to the "measurement report" specified by the 3GPP and channel setting is realized using messages for setting or changing channels such as "radio bearer setup" and "radio bearer reconfiguration" specified in the 3GPP. Furthermore, the channel setting may also be realized by reporting quality measurement through the "measurement control" for controlling quality measurement.

Figure 11:
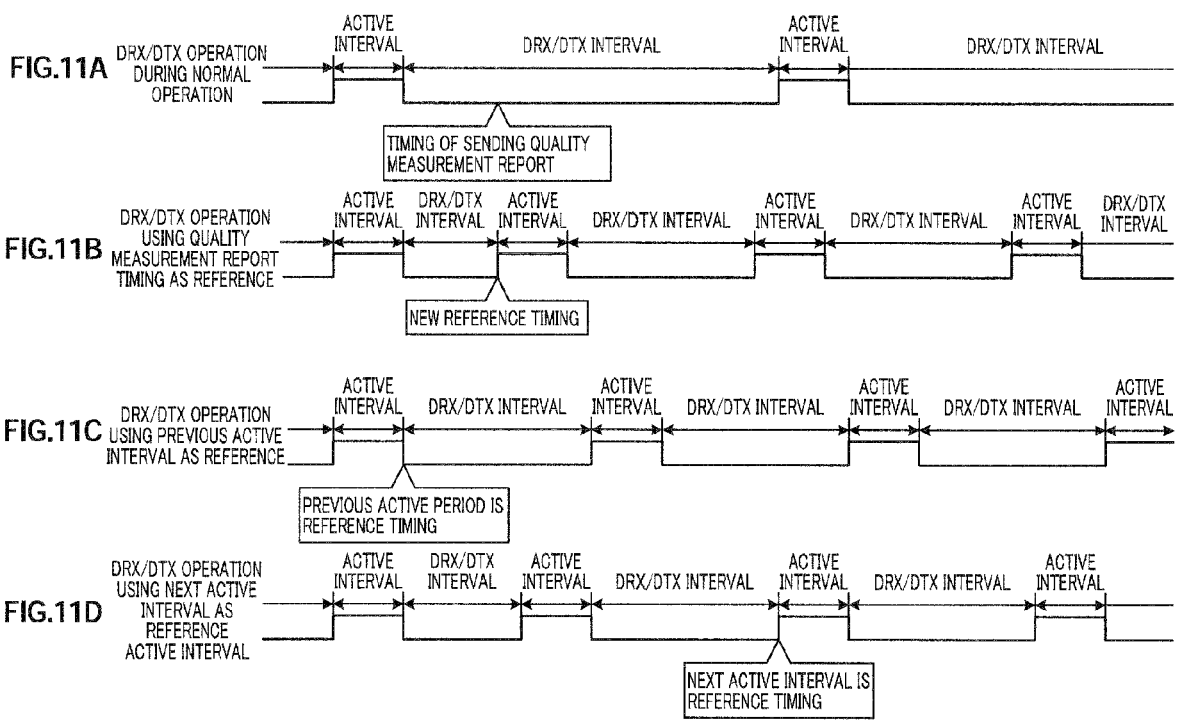
FIG. 11 shows a DRX/DTX operation when reference timing of a DRX/DTX interval changes.

Although the present embodiment has been shown such that a terminal transmits a quality measurement report at a predetermined active interval, the quality measurement report may also be transmitted during the DRX/DTX interval. In that case, the reference timing of the DRX/DTX interval may be set at the timing the quality measurement report is sent (see FIG. 11B) or may be defined based on the normal DRX/DTX interval. Furthermore, if the reference timing of the DRX/DTX interval are defined based on the normal reference DRX/DTX interval, a method of using the preceding active period as a reference (see FIG. 11C), a method of using the next active period as a reference (see FIG. 11D), and so on, may be possible. However, the present invention is limited to none of these methods and any method can be used or different methods may be used. By the way, the controlled DRX/DTX interval shown in FIGS. 11B to D represents the case where the DRX/DTX interval during the normal operation (FIG. 11A) is reduced to half.

Furthermore, the above described example shows the case where the DRX/DTX interval and active interval are defined separately, but it is also possible to define so that the DRX/DTX interval includes the active interval. Such a case can also be controlled under a similar concept.

Embodiment 2

Figure 12:
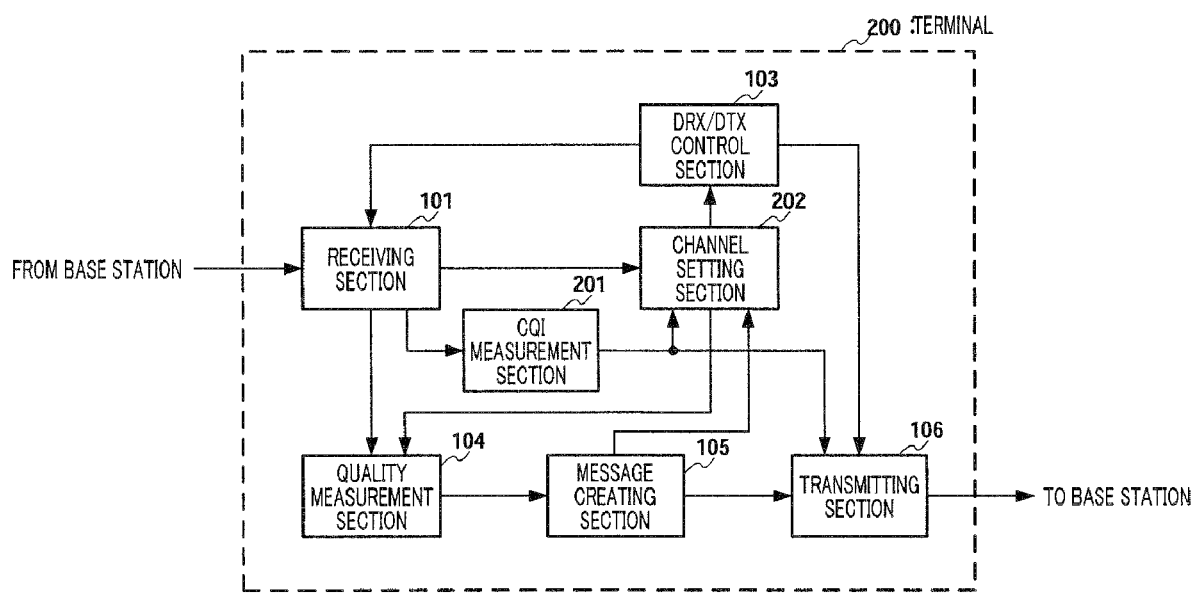
FIG. 12 is block diagram showing a configuration of a terminal according to Embodiment 2 of the present invention.

FIG. 12 is a block diagram showing a configuration of terminal 200 according to Embodiment 2 of the present invention. FIG. 12 is different from FIG. 4 in that CQI measurement section 201 is added and channel setting section 102 is changed to channel setting section 202.

CQI measurement section 201 measures the CQI from a signal outputted from receiving section 101 and outputs the measured CQI to channel setting section 202 and transmitting section 106.

In addition to the function of Embodiment 1, channel setting section 202 decides a change of the DRX/DTX interval based on the CQI outputted from CQI measurement section 201. That is, channel setting section 202 decides whether or not to change the DRX/DTX interval or further decides, when changing the DRX/DTX interval, to what interval the DRX/DTX interval should be changed. Channel setting section 202 controls DRX/DTX control section 103 according to the decision result. Furthermore, channel setting section 202 receives and holds a CQI threshold to be used to decide DRX/DTX control as channel setting information.

Figure 13:
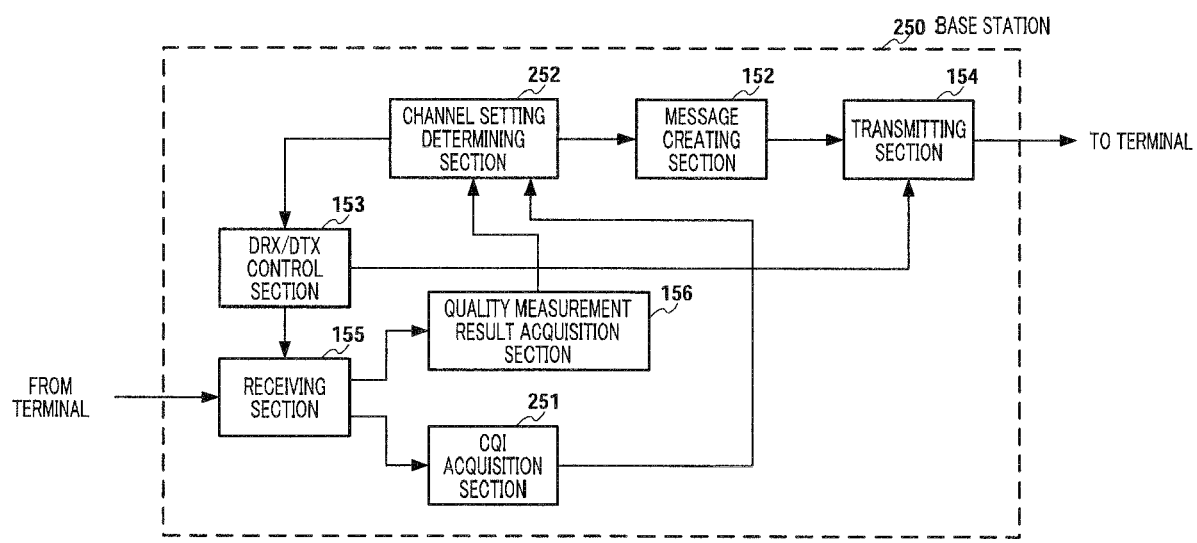
FIG. 13 is a block diagram showing a configuration of a base station according to Embodiment 2 of the present invention.

FIG. 13 is a block diagram showing a configuration of base station 250 according to Embodiment 2 of the present invention. FIG. 13 is different from FIG. 7 in that CQI acquisition section 251 is added and channel setting determining section 151 is changed to channel setting determining section 252.

CQI acquisition section 251 acquires the CQI included in a signal outputted from receiving section 155 and outputs the acquired CQI to channel setting determining section 252.

In addition to the function of Embodiment 1, channel setting determining section 252 decides a change of the DRX/DTX interval based on the CQI outputted from CQI acquisition section 251. That is, channel setting determining section 252 decides whether or not to change the DRX/DTX interval or further decides, when changing the DRX/DTX interval, to what interval the DRX/DTX interval should be changed. Channel setting determining section 252 controls DRX/DTX control section 153 according to the decision result. Furthermore, channel setting determining section 252 determines and holds the CQI threshold to be used to decide whether or not to perform DRX/DTX control as channel setting information and includes the CQI threshold in channel setting information for the terminal.

Figure 14:
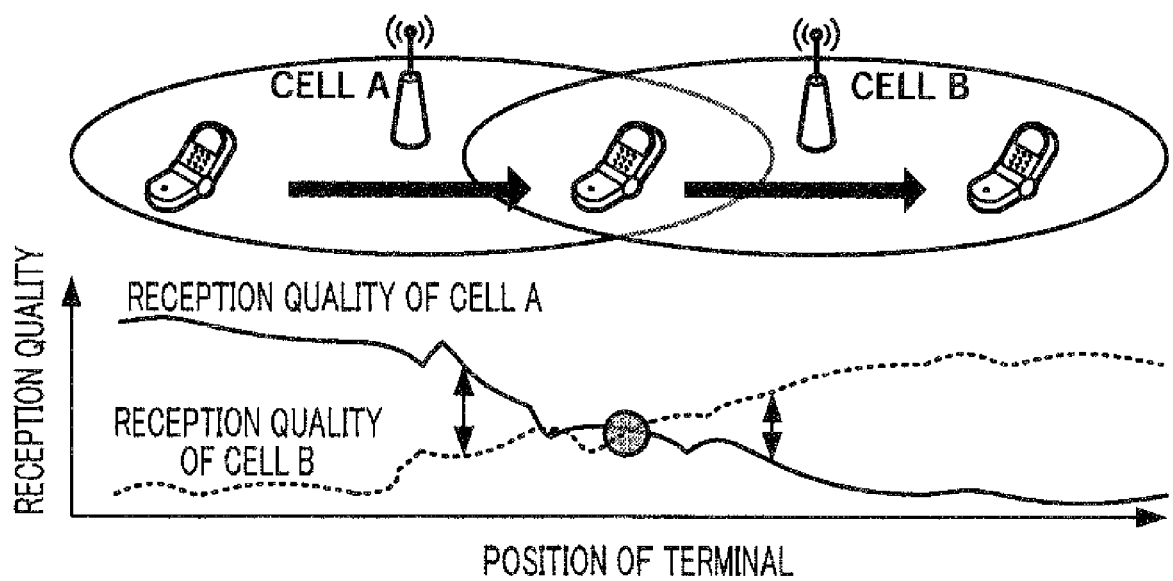
FIG. 14 shows how a terminal moves from cell A to cell B.

FIG. 14 shows how terminal 200 moves from cell A to cell B. In such a case, as for the quality measurement result of terminal 200, event 1a occurs when cell B is detected, event 1d occurs when the quality of cell B becomes better than cell A and event 1b occurs when cell A can no longer be detected. However, even when event 1d occurs, if the interval is so long that terminal 200 can communicate with both cell A and cell B, terminal 200 may be able to communicate with cell A for a while. Such a decision is made using the CQI.

As described above, it is not possible to decide how long terminal 200 can communicate with its own cell based solely on the quality measurement result used in Embodiment 1. By contrast with that, the CQI indicates in what quality communication is possible, so that, based on its value, in what manner and mode (multivalue conversion, coding rate, etc.) communication is performed is determined. Therefore, the use of its value makes it possible to decide whether or not communication with the local cell is still possible. Therefore, the following operation is possible.

In event 1a, if the CQI of the own cell is equal to or higher than a threshold, the DRX/DTX interval is maintained as is. On the other hand, if the CQI of the current cell is not higher than the threshold, the DRX/DTX interval changes to an interval appropriate for carrying out event 1d transmission.

Furthermore, event 1b is not processed because this operation does not particularly involve mobility operations. Furthermore, suppose event 1c is similar to event 1a.

Furthermore, in event 1d, if the CQI of the current cell is equal to or higher than a threshold and the effective period of the CQI (set based on eNB) is longer than the DRX/DTX interval, the DRX/DTX interval is maintained as is. When the CQI of the own cell is equal to or higher than a threshold and the effective period of the CQI (set based on eNB) is shorter than the DRX/DTX interval, the DRX/DTX interval changes to the effective period of the CQI. If the CQI of the own cell is not higher than the threshold, the DRX/DTX interval changes to an interval appropriate for receiving a handover indication.

Here, the effective period of the CQI is a value indicating how long the CQI received once can be used as an effective value, and is specified from the network side. Furthermore, this period may be made identical to the transmission interval of the CQI.

In this way, according to Embodiment 2, when an interval during which communication is possible with both the base stations of the handover source and the handover destination is long, the terminal can decide whether or not it is possible to communicate with the handover source base station based on the CQI of the signal transmitted from the handover source base station.

Figures 15A, 15B, 15C:
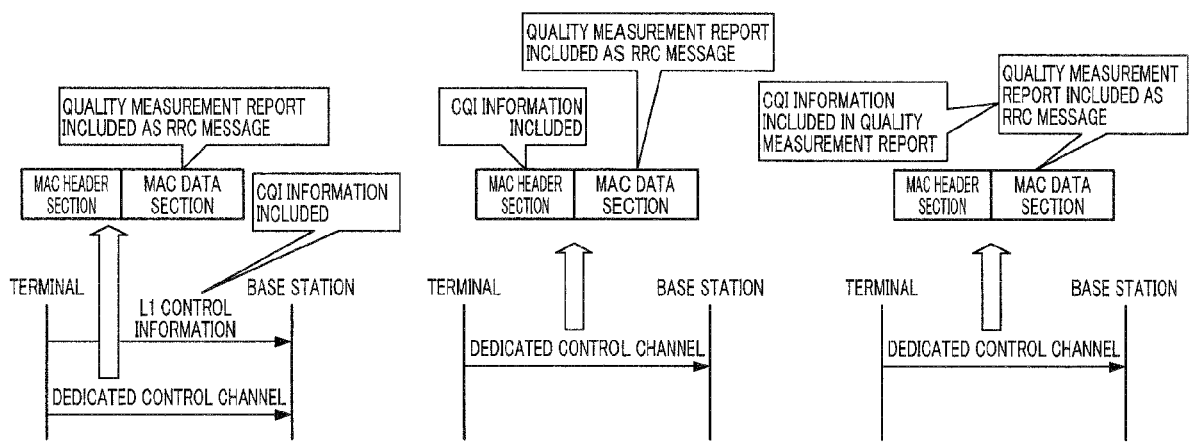
FIG. 15 is a conceptual diagram showing a CQI transmission method.

The CQI value in the 3GPP is transmitted not through a dedicated control channel ("DCCH") but with L1 control information and so on. In this embodiment, when transmission of the CQI is necessary for the normal operation, that is, determination of a transmission setting of a downlink shared channel, the CQI may be sent with L1 control information as is conventionally done. When there is no such necessity, the CQI may be transmitted with L1 control information together with normal operation as shown in FIG. 15A. The case shown in this FIG. 15A is a case where the L1 control information and dedicated control channel are transmitted with different radio resources. Furthermore, as shown in FIG. 15B, the CQI may be transmitted with a MAC header for sending a dedicated control channel. Furthermore, as shown in FIG. 15C, it is also possible to send the CQI included in an RRC message sent through a dedicated control channel as in the case of a quality measurement report. The CQI threshold may take a value that varies from one event to another.

The present embodiment decides whether or not to maintain the DRX/DTX interval using the CQI value. This is because the CQI value is optimal information for indicating channel quality at a given time. Other possible candidates include quality measurement result values. The quality measurement result value is used for the transfer control and averaging is generally performed over a longer period than the CQI. Therefore, although the quality measurement result does not correspond to channel quality at this time, this quality measurement result may be used instead of the CQI value. In this case, it is not necessary to report extra CQI's.

Embodiment 3

Figure 16A:
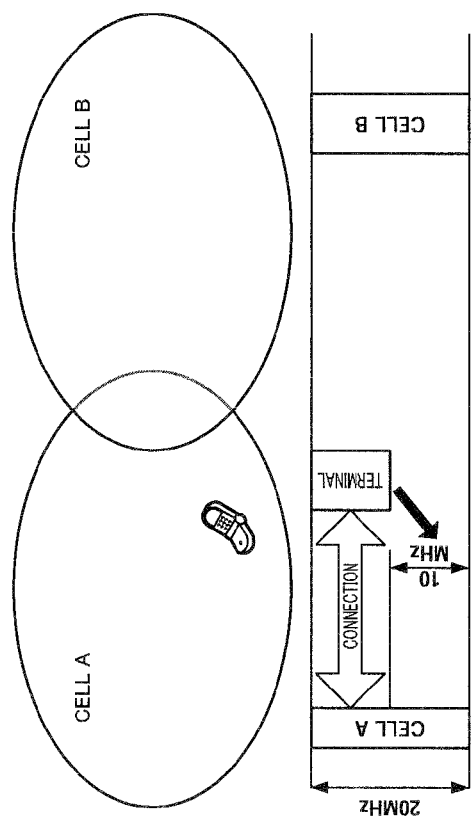
FIG. 16 shows a case where measurement of different frequencies is performed.
Figure 16B:
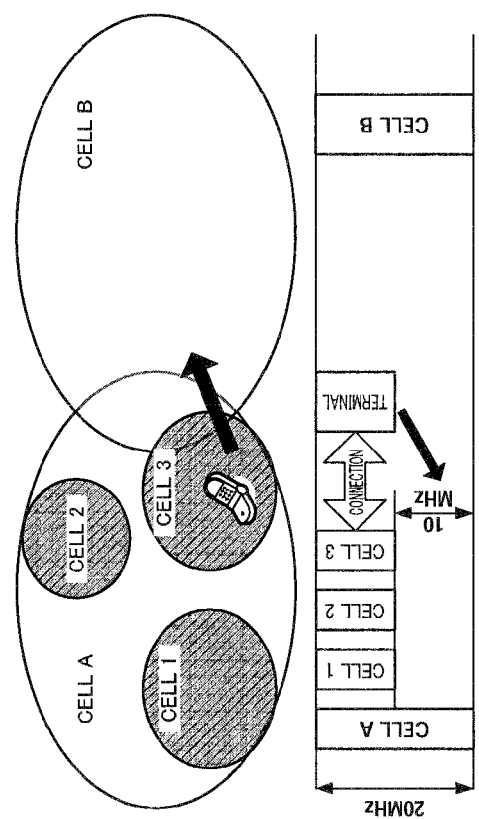

FIG. 16 shows a case where measurement of different frequencies is performed. FIG. 16A shows "case 1" in which measurement of different frequencies is performed in the own cell and FIG. 16B shows "case 2" in which measurement of different frequencies is performed in cells other than the own cell.

In case 1, even when it is judged that the quality of another frequency band is better, frequency change processing needs not be performed immediately, because the cell does not change and communication in the current frequency band can be maintained even if the quality of another frequency band is better.

On the other hand, in case 2, when it is decided that the quality of another frequency band is better, frequency change processing needs to be performed immediately, because the terminal may have moved in the range of another cell. Taking this into account, when measurement of different frequencies is performed, it may be decided whether the case of interest corresponds to case 1 or case 2 so as to make it possible to change the frequency immediately in case 2 and perform no particular processing in case 1.

Figure 17:
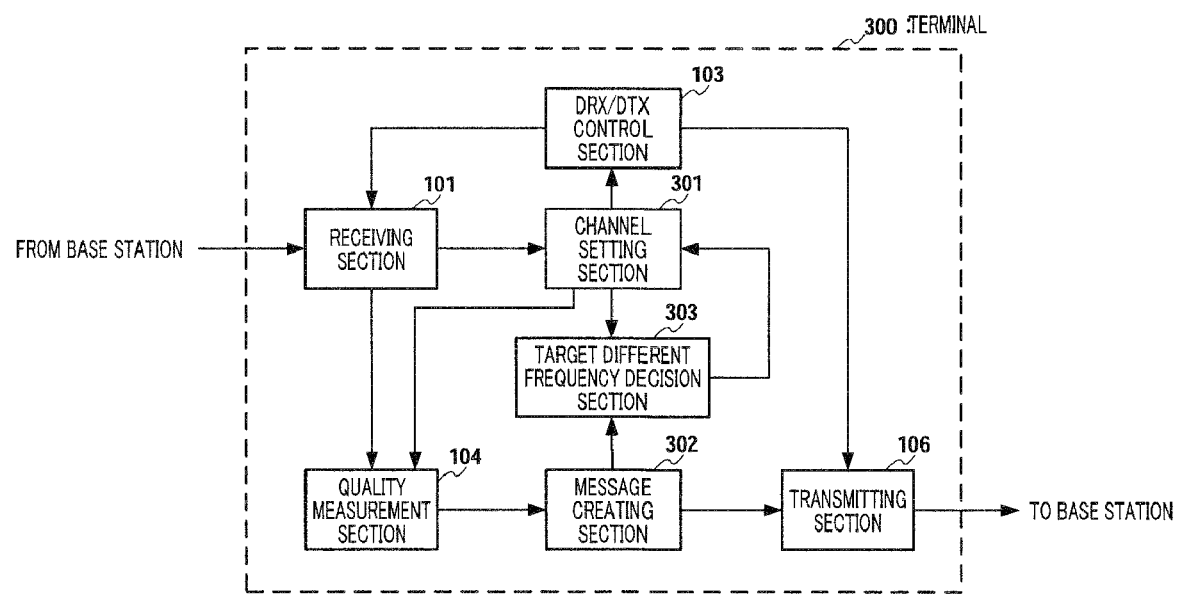
FIG. 17 is a block diagram showing a configuration of a terminal according to Embodiment 3 of the present invention.

FIG. 17 is a block diagram showing a configuration of terminal 300 according to Embodiment 3 of the present invention. FIG. 17 is different from FIG. 4 in that target different frequency decision section 303 is added and channel setting section 102 is changed to channel setting section 301 and message creating section 105 is changed to message creating section 302.

In addition to the function of Embodiment 1, channel setting section 301 outputs information about a target different frequency transmitted from the base station to target different frequency decision section 303.

Message creating section 302 creates a message including a measurement result outputted from quality measurement section 104 and outputs the created message to transmitting section 106. Furthermore, message creating section 302 outputs the measurement result outputted from quality measurement section 104 to target different frequency decision section 303.

Target different frequency decision section 303 decides whether the target different frequency corresponds to case 1 or case 2 shown in FIG. 16 based on information about the target different frequency outputted from channel setting section 301 and the quality measurement result outputted from message creating section 302. When the target different frequency is decided to correspond to case 2, the quality measurement result outputted from message creating section 302 is outputted to channel setting section 301. On the other hand, when the target different frequency is decided to correspond to case 1, no particular processing is performed.

Figure 18:
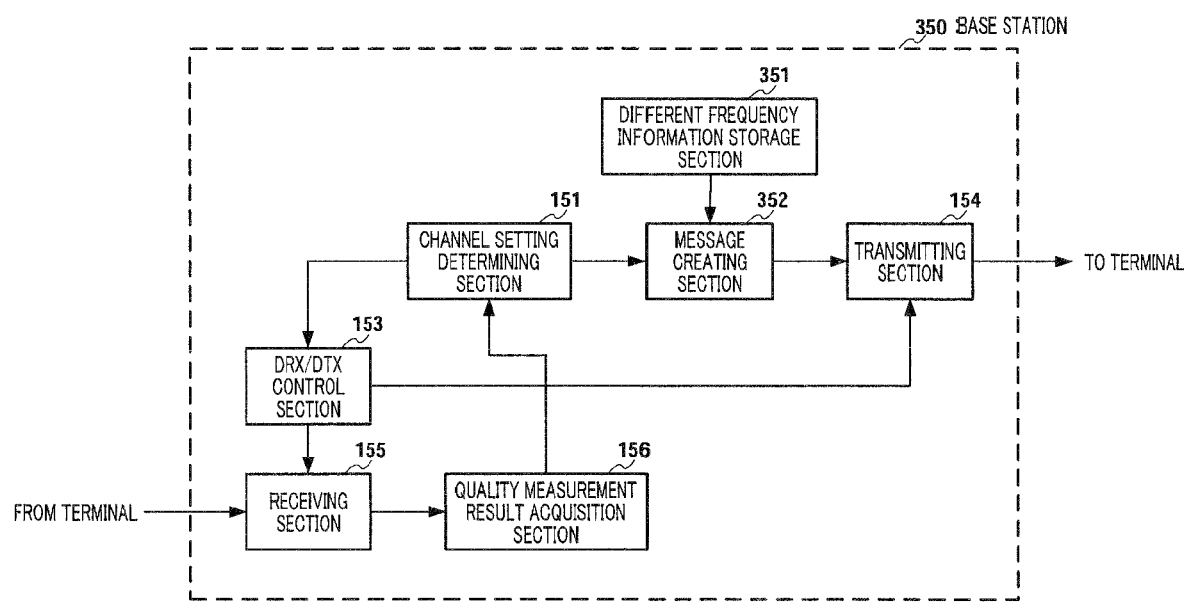
FIG. 18 is a block diagram showing a configuration of a base station according to Embodiment 3 of the present invention.

FIG. 18 is a block diagram showing a configuration of base station 350 according to Embodiment 3 of the present invention. FIG. 18 is different from FIG. 7 in that different frequency information storage section 351 is added and message creating section 152 is changed to message creating section 352.

Different frequency information storage section 351 stores information (i.e. different frequency information) of the target different frequency and outputs stored different frequency information to message creating section 352.

Message creating section 352 creates a message including the channel setting information outputted from channel setting determining section 151 and different frequency information outputted from different frequency information storage section 351, and outputs the created message to transmitting section 154.

In this way, with Embodiment 3, distinction is drawn between measurement of different frequencies in the same cell and measurement of different frequencies between different cells, and the DRX/DTX interval is changed for both the terminal and the base station when triggered by a quality measurement result report from the terminal to the base station only when measurement of different frequencies is performed between different cells, so that it is possible to perform a handover to different cells fast.

Embodiment 4

Above described Embodiments 1 to 3 have explained cases where the DRX/DTX interval is changed when triggered by a quality measurement result report (i.e. measurement report) from the terminal to the base station, but Embodiment 4 of the present invention will be explained with reference to a case where an active period is extended and DRX/DTX is finished when triggered by a control message such as measurement report.

Figure 19:
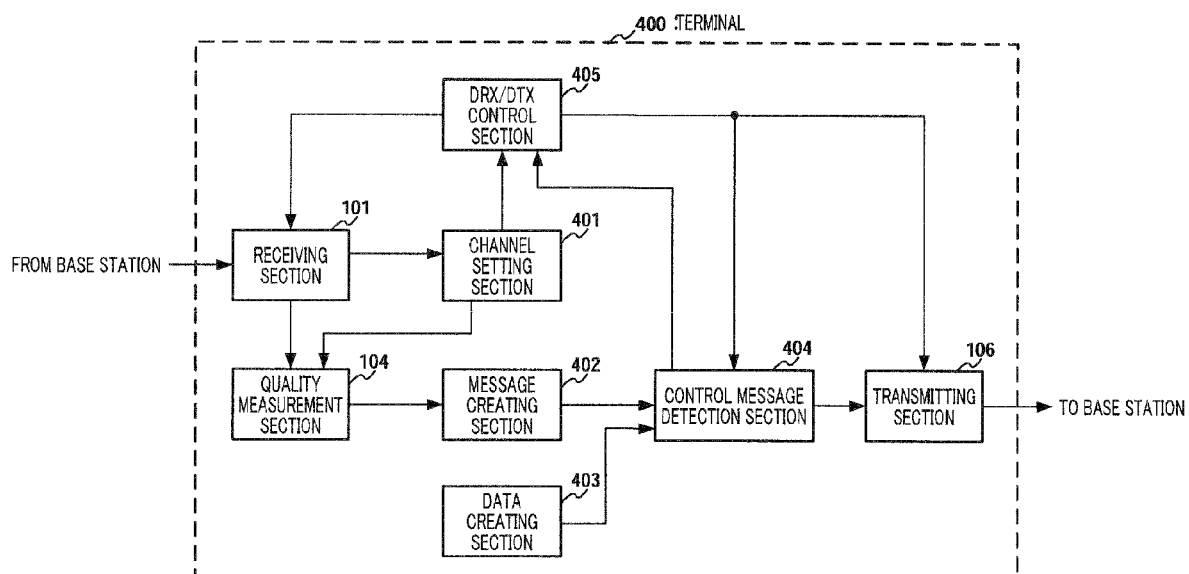
FIG. 19 is a block diagram showing a configuration of a terminal according to Embodiment 4 of the present invention.

FIG. 19 is a block diagram showing a configuration of terminal 400 according to Embodiment 4 of the present invention. FIG. 19 is different from FIG. 4 in that data creating section 403 and control message detection section 404 are added and channel setting section 102 is changed to channel setting section 401, message creating section 105 is changed to message creating section 402 and DRX/DTX control section 103 is changed to DRX/DTX control section 405.

Channel setting section 401 performs a channel setting based on channel setting information included in a signal outputted from receiving section 101. The channel setting information includes command information such as quality measurement and DRX/DTX control and channel setting section 401 controls quality measurement section 104 based on the quality measurement command information. Furthermore, channel setting section 401 outputs a control command of DRX/DTX to DRX/DTX control section 405 based on the command information about DRX/DTX control. Furthermore, channel setting section 401 also sends information about the processing performed upon receiving a report from control message detection section 404, that is, an extension of the active period and end of DRX/DTX here.

Message creating section 402 creates a control message such as a measurement report and outputs the created control message to control message detection section 404.

Data creating section 403 creates user data such as speech, image, and text and outputs the created user data to control message detection section 404.

Of the control message outputted from message creating section 402 and the user data outputted from data creating section 403, control message detection section 404 detects the control message. Here, since the control message and user data are supported by different channels, it may be possible to detect the control message based on the difference between the logical channels. Upon detecting the control message, control message detection section 404 reports whether or not to execute the control command outputted from channel setting section 401 to DRX/DTX control section 405 based on the current DRX/DTX control status reported from DRX/DTX control section 405 (described later).

DRX/DTX control section 405 controls DRX/DTX based on the control command outputted from channel setting section 401 and also holds information about processing upon receiving the report from control message detection section 404, that is, an extension of the active period and end of DRX/DTX. Furthermore, DRX/DTX control section 405 extends the active period or ends DRX/DTX based on the report on whether or not to execute the control command outputted from control message detection section 404 and controls DRX of receiving section 101 and DTX of transmitting section 106. Furthermore, DRX/DTX control section 405 reports the current DRX/DTX control status to control message detection section 404.

Figure 20:
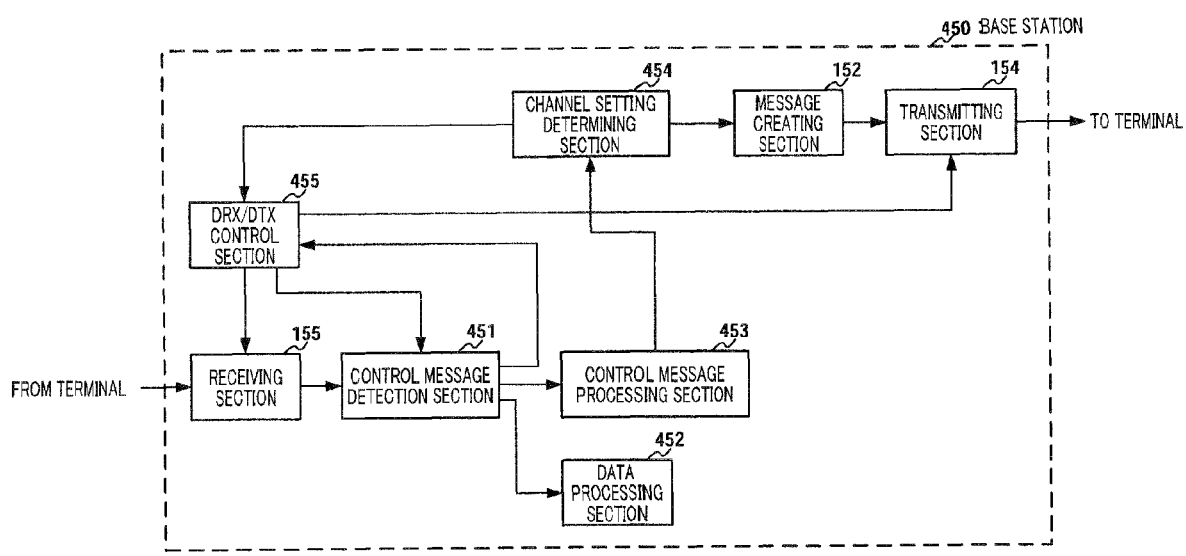
FIG. 20 is a block diagram showing a configuration of a base station according to Embodiment 4 of the present invention.

FIG. 20 is a block diagram showing a configuration of base station 450 according to Embodiment 4 of the present invention. FIG. 20 is different from FIG. 7 in that control message detection section 451, data processing section 452 and control message processing section 453 are added and channel setting determining section 151 is changed to channel setting determining section 454 and DRX/DTX control section 153 is changed to DRX/DTX control section 455.

Control message detection section 451 detects whether or not a control message is included in a signal outputted from receiving section 155 and outputs, when the control message is detected, the control message detected to control message processing section 453 and outputs, when no control message is detected, that is, when the signal outputted from receiving section 155 is user data, the user data to data processing section 452. Furthermore, upon detecting a control message, control message detection section 451 reports to DRX/DTX control section 455 whether or not to execute a control command outputted from channel setting determining section 454 (described later), based on the current DRX/DTX control status reported from DRX/DTX control section 455. Here, since the logical channel of the control message is different from that of the user data, a control message may be detected depending on the difference in the logical channel.

Data processing section 452 processes the user data outputted from control message detection section 451.

Control message processing section 453 processes the control message outputted from control message detection section 451 and outputs the processed control message to channel setting determining section 454.

Channel setting determining section 454 determines the details of a channel setting prepared by terminal 400 shown in FIG. 19 based on the control message outputted from control message processing section 453 and outputs the determined details (i.e. channel setting information) to message creating section 152. Furthermore, channel setting determining section 454 outputs a control command of DRX/DTX to DRX/DTX control section 455 based on the control message and soon outputted from control message processing section 453. Furthermore, channel setting determining section 454 also sends information about the processing performed upon receiving a report from control message detection section 451, that is, an extension of the active period and end of DRX/DTX and so on here.

DRX/DTX control section 455 controls DRX/DTX based on the control command outputted from channel setting determining section 454, and holds information about the processing performed upon receiving a report from control message detection section 451, that is, an extension of the active period and end of DRX/DTX and so on. Furthermore, DRX/DTX control section 455 ends DRX/DTX or extends the active period based on a report from the control message detection section 451 and controls the DRX of receiving section 155 and the DTX of transmitting section 154. Furthermore, DRX/DTX control section 455 reports the current DRX/DTX control status to control message detection section 451.

Figure 21:
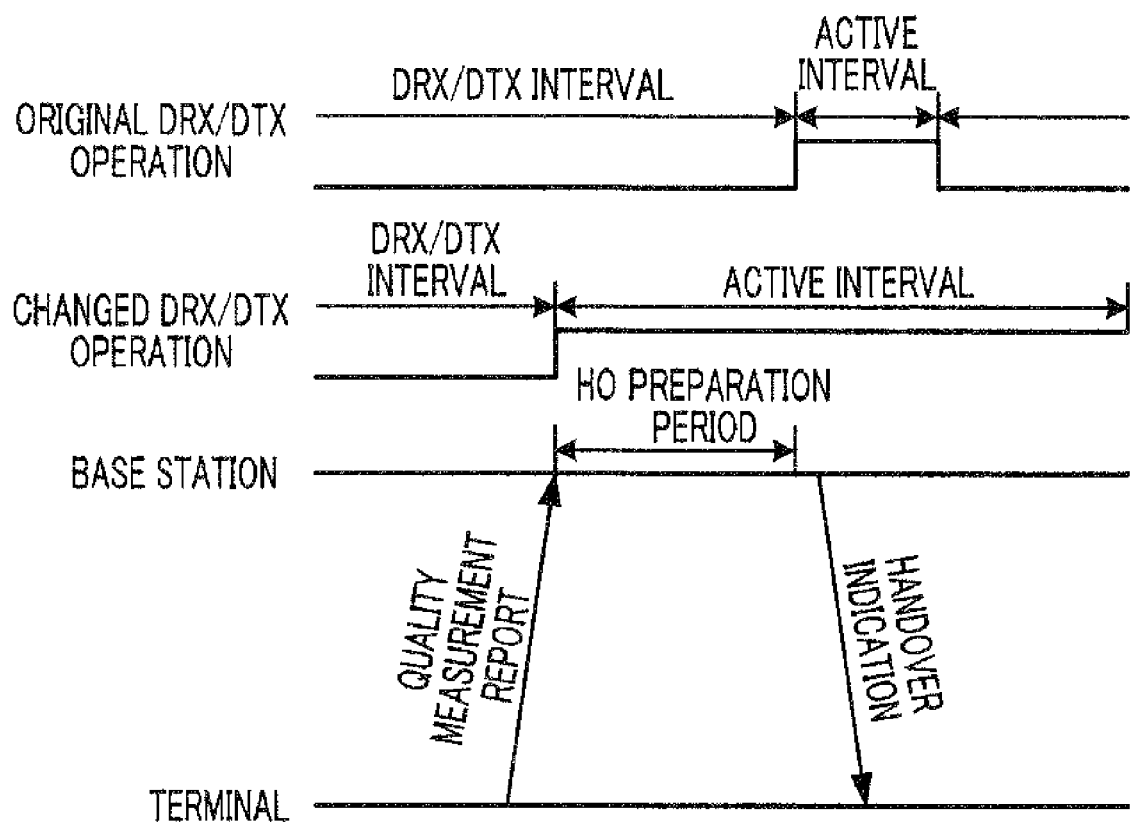
FIG. 21 is a timing chart during handover processing.

Next, DRX/DTX control during handover processing between aforementioned terminal 400 and base station 450 will be explained. First, there can be two timings for transmitting a measurement report from the terminal. One is the case of performing transmission during a DRX/DTX period and the other is the case of performing transmission during an active period. When a measurement report is transmitted during a DRX/DTX period in the first case, both the terminal that performs transmission and the base station that performs reception need to perform different DRX/DTX operations from normal operation. That is, when transmission is performed during a DRX/DTX period, handover processing needs to be performed suddenly and as a result of this DRX/DTX processing may be suspended. FIG. 21 shows this operation.

Figure 22:
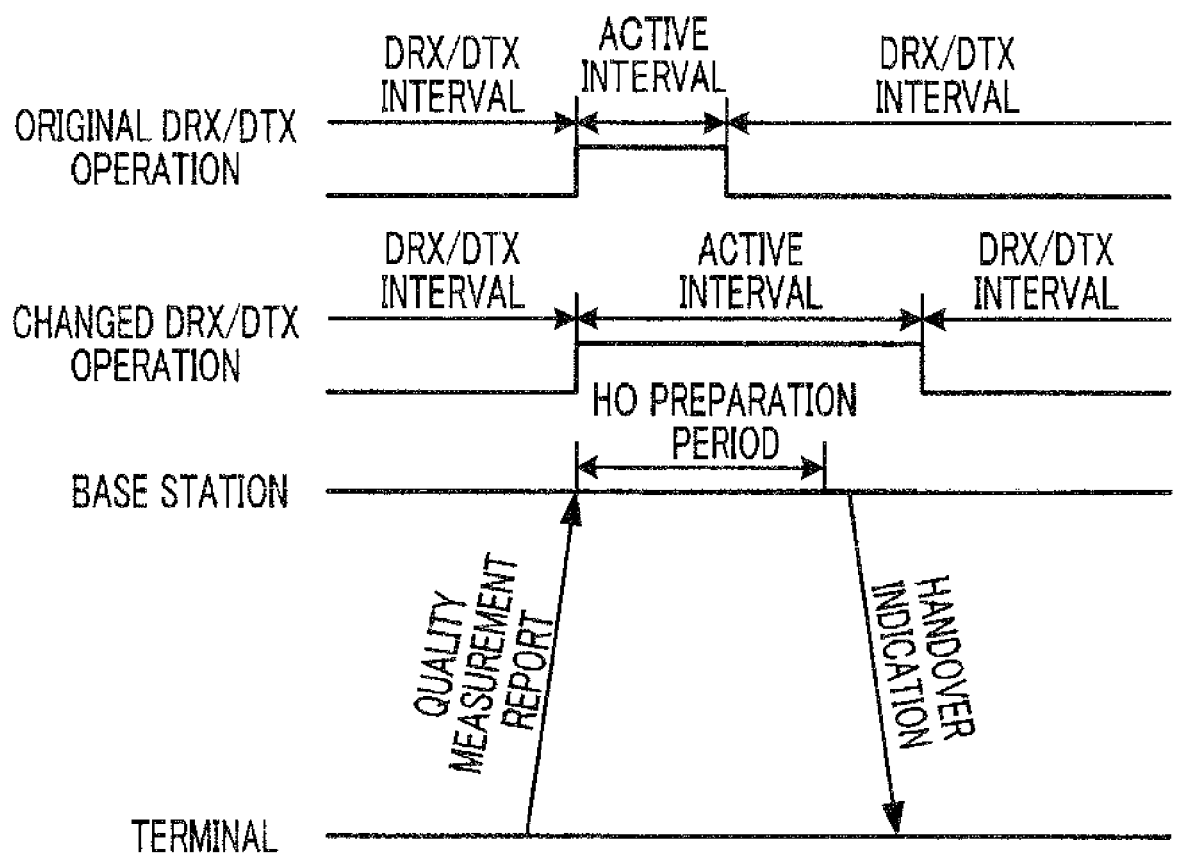
FIG. 22 is a timing chart during handover processing.

On the other hand, when a measurement report is transmitted during the active period in the second case, both the terminal that performs transmission and the base station that performs reception are assumed to perform normal processing and this does not lead to an end of DRX/DTX. However, the normal DRX/DTX operation is assumed to be defined so as to on a regular basis receive data and so on. Therefore, a different operation is assumed after a control message such as a measurement report, that is, an RRC message, is transmitted. For example, handover processing is assumed when the control message is a measurement report and call setting processing is assumed when the control message is a request for a new call. Therefore, when the base station receives an RRC message and when the terminal transmits an RRC message, it is possible to extend the active period or finish DRX/DTX. FIG. 22 shows this operation.

In this way, according to Embodiment 4, both the terminal and base station control the extension of the active period and end of DRX/DTX when triggered by transmission or reception of a control message, so that it is possible to complete a handover fast.

Although the present embodiment does not mention a layer for controlling DRX/DTX, this layer is assumed to be executed by MAC. Furthermore, the present invention is not limited to this and DRX/DTX may also be controlled by RRC since the DRX/DTX control is when triggered by an RRC message. In this case, if finer control than control by MAC is possible, control for each RRC message is also possible.

Furthermore, in the explanations so far, the present embodiment has been explained to roughly judge whether data is sent or an RRC message is sent by MAC, but message creating section 402 of terminal 400 may also add a flag to a control message and control message detection section 404 may detect the flag. That is, the necessity for changing DRX/DTX may be added to a message through primitives and so on from RRC to MAC. Such an operation make possible finer operation.

The present embodiment has shown a case where the base station sets operation in the terminal when transmitting control messages during DRX/DTX control. An RRC message may be used for this setting. Furthermore, a dedicated setting may be applied to each terminal using a dedicated RRC message, or broadcast information may be used when a common setting is applied to each terminal.

The present embodiment has explained the operation during handover, but the present invention is not limited to this and is also applicable to processing other than handover. To be more specific, there can be cases such as when a terminal requests a new service, when a service already in use is released and when a security-related setting is confirmed and so on, but the present invention is not limited to this.

Furthermore, MAC may also perform fine control. To be more specific, such control may include, for example, reporting the amount of data remaining on the terminal side. In such a case, a message of MAC as a control message may also be considered.

The above described embodiments have explained the present invention with reference to an operation in one radio access technology ("RAT"), that is, intra-RAT transfer control, but this operation may be allied to inter-RAT transfer control as well.

Furthermore, the above described embodiments have explained only transfer control and therefore DRX/DTX interval is controlled based on a quality measurement report, but the present invention is also applicable to other operations as well. To be more specific, possibilities include, when information to which a new service is added is transmitted from a terminal, comparing the DRX/DTX interval of the service currently in use with the DRX/DTX interval the new service requires and using the shorter one or using a DRX/DTX interval combining the two.

The above described embodiments have explained cases where the present invention is configured by hardware as examples, but the present invention can also be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The disclosures of Japanese Patent Application No. 2006-175821, filed on Jun. 26, 2006, and Japanese Patent Application No. 2006-299297, filed on Nov. 2, 2006, including the specifications, drawings and abstracts, are incorporated herein by reference in their entirety.

INDUSTRIAL APPLICABILITY

The radio communication terminal apparatus, radio communication base station apparatus and radio communication method according to the present invention can complete handover fast even during a DRX/DTX period and are applicable to a mobile radio communication system and so on.

The invention claimed is:

1. A radio communication terminal apparatus comprising:
a reception section that receives a signal transmitted from a radio communication base station apparatus;
a discontinuous reception control section that controls a length of an inactive period of discontinuous reception based on control information included in the received signal and based on transmission of a transmission signal to the radio communication base station; and
a transmission section that transmits the transmission signal to the radio communication base station apparatus,
wherein the control information included in the received signal indicates a short length for controlling the inactive period of the discontinuous reception, and the discontinuous reception control section uses the short length for controlling the inactive period of discontinuous reception after the transmission of the transmission signal.

2. The radio communication terminal apparatus according to claim 1, wherein the transmission signal comprises a transmission of a quality measurement result to the radio communication base station apparatus.

3. The radio communication terminal apparatus according to claim 2, wherein the discontinuous reception control section controls the length of the inactive period of discontinuous reception according to various events specified by a relationship between the communication quality of a cell of the radio communication terminal apparatus and the communication quality of another cell.

4. The radio communication terminal apparatus according to claim 2, further comprising:
 a channel quality indicator measurement section that measures a channel quality indicator from the received signal, wherein:
 the discontinuous reception control section controls the length of the inactive period of discontinuous reception based on threshold value information for the channel quality indicator included in the received signal and based on the measured channel quality indicator.

5. The radio communication terminal apparatus according to claim 2, further comprising:
 a determination section that determines whether the quality measurement result shows a measurement result of different frequencies in a cell or a measurement result of different frequencies between different cells, wherein:
 the discontinuous reception control section controls the length of the inactive period of discontinuous reception based on the quality measurement result only when the quality measurement result shows the measurement result of different frequencies between different cells.

6. The radio communication terminal apparatus according to claim 1, wherein, if a control message is transmitted or received during discontinuous reception, the discontinuous reception control section extends an active period and finishes the discontinuous reception.

7. A radio communication base station apparatus comprising:
 a quality measurement result acquisition section that acquires a quality measurement result transmitted from a radio communication terminal apparatus and measured at the radio communication terminal apparatus;
 a transmission section that transmits a message to the radio communication terminal apparatus, the message including control information for controlling a length of an inactive period of discontinuous reception at the radio communication terminal apparatus, based on the acquired quality measurement result; and
 a discontinuous reception control section that controls a length of an inactive period of discontinuous reception of the radio communication base station apparatus, based on the acquired quality measurement result, in accordance with the length of the inactive period of discontinuous reception controlled at the radio communication terminal apparatus, based on the control information,
 wherein the control information included in the received signal indicates a short length for controlling the inactive period of the discontinuous reception.

8. The radio communication base station apparatus according to claim 7, further comprising:
 a channel quality indicator acquisition section that acquires a channel quality indicator transmitted from the radio communication terminal apparatus and measured at the radio communication terminal apparatus; and
 a transmission section that transmits a message including threshold value information for the channel quality indicator for controlling the length of the inactive period of discontinuous reception based on the acquired channel quality indicator, wherein:
 the discontinuous reception control section controls the length of the inactive period of discontinuous reception of the radio communication base station apparatus based on the acquired channel quality indicator and the threshold value information for the channel quality indicator transmitted from the radio communication terminal apparatus.

9. The radio communication base station apparatus according to claim 7, wherein, if a control message is transmitted or received during discontinuous reception, the discontinuous reception control section extends an active period and finishes the discontinuous reception.

10. A radio communication method comprising:
 measuring quality of a signal received from a radio communication base station apparatus at a radio communication terminal apparatus;
 controlling a length of an inactive period of discontinuous reception of the radio communication terminal apparatus based on first control information for controlling the length of the inactive period of discontinuous reception and based on the quality measurement result;
 transmitting the quality measurement result to the radio communication base station apparatus;
 acquiring at the radio communication base station apparatus the quality measurement result measured at the radio communication terminal apparatus;
 transmitting to the radio communication terminal apparatus a message including second control information, for controlling the length of the inactive period of discontinuous reception of the radio communication terminal apparatus, based on the acquired quality measurement result; and
 controlling the length of an inactive period of discontinuous reception of the radio communication base station apparatus, based on the acquired quality measurement result, in accordance with the length of the inactive period of discontinuous reception controlled at the radio communication terminal apparatus, based on the second control information,
 wherein the first and second control information each indicate a short length for controlling the inactive period of the discontinuous reception.

* * * * *